United States Patent [19]
Li et al.

[11] Patent Number: 5,991,008
[45] Date of Patent: Nov. 23, 1999

[54] SCANNER FACET HEIGHT ERROR COMPENSATION HAVING SELECTIVE PIXEL MODIFICATION

[75] Inventors: Yun Zhong Li; Douglas D. Jensen, both of Woodbury; Richard R. Lemberger, Columbus, all of Minn.

[73] Assignee: Imation Corp., St. Paul, Minn.

[21] Appl. No.: 08/941,464

[22] Filed: Sep. 30, 1997

[51] Int. Cl.⁶ .............................. G03B 27/70; H04N 1/04
[52] U.S. Cl. ............................. 355/66; 355/77; 344/200; 358/481; 347/248
[58] Field of Search ................... 355/66, 71, 77; 358/293, 284, 285, 298; 347/248; 250/235, 236; 399/200

[56] References Cited

U.S. PATENT DOCUMENTS

| | | | |
|---|---|---|---|
| 4,204,233 | 5/1980 | Swager | 358/293 |
| 4,205,348 | 5/1980 | DeBenedictis | 358/285 |
| 4,214,157 | 7/1980 | Check, Jr. | 250/236 |
| 4,310,757 | 1/1982 | Check, Jr. | 250/236 |
| 4,386,272 | 5/1983 | Check, Jr. | 250/236 |
| 4,622,593 | 11/1986 | Curry | 358/284 |
| 4,635,000 | 1/1987 | Swanberg | 331/10 |
| 4,639,789 | 1/1987 | Curry | 358/285 |
| 4,766,560 | 8/1988 | Curry | 364/721 |
| 4,860,237 | 8/1989 | Curry | 364/718 |
| 4,862,289 | 8/1989 | Shimada | 358/298 |
| 4,935,891 | 6/1990 | Curry | 364/721 |
| 5,111,062 | 5/1992 | Hunter | 307/269 |
| 5,138,479 | 8/1992 | Ando | 359/216 |
| 5,212,570 | 5/1993 | Nacman | 358/481 |
| 5,315,112 | 5/1994 | Harris | 250/235 |
| 5,477,330 | 12/1995 | Dorr | 358/296 |
| 5,489,936 | 2/1996 | Appel | 347/248 |
| 5,617,132 | 4/1997 | Fisli | 347/235 |

FOREIGN PATENT DOCUMENTS

| | | |
|---|---|---|
| 0 357 190 | 3/1990 | European Pat. Off. |
| 0 581 083 | 2/1994 | European Pat. Off. |

Primary Examiner—D. Rutledge
Attorney, Agent, or Firm—Kent J. Sieffert

[57] ABSTRACT

A method and system for compensating for scanner facet height error in a laser imaging application including a rotating polygon for directing a laser beam across a dimension of a photographic element. The present invention compensates for facet height error by measuring a scan interval for each facet of the rotating polygon and modifies the pixel clock for a subset of pixels of each scan line as a function of variations in scan intervals for the respective facets of the rotating polygon.

Several advantages of the present invention have been illustrated including the low cost of such a compensation system and technique. Furthermore, the present invention is not limited in accuracy by the pixel clock as are conventional techniques. Furthermore, the modified pixels are evenly distributed over the entire length of the facet's corresponding scan line.

23 Claims, 4 Drawing Sheets

SCANNER FACET HEIGHT ERROR COMPENSATION HAVING SELECTIVE PIXEL MODIFICATION

FIELD OF THE INVENTION

This invention relates generally to laser imaging systems. More particularly, the present invention relates to a system and method for compensating for scanner facet height error by selectively modifying pixel length.

BACKGROUND

In the field of medical imaging, diagnostic information from medical equipment is often output for viewing on a photographic element. Typically, the diagnostic information is recorded on the photographic element by exposing the element to radiation emitted by a radiation source such as a semiconductor laser diode. Other fields, such as graphic arts, also use photographic elements that are sensitized to imaging by a laser source. Typical laser sources include argon ion lasers, helium neon lasers as well as semiconductor laser diodes.

In laser imaging applications, the photographic element is exposed along one dimension by a laser beam that is modulated according to image data. The image data is a sequence of digital image values. Image processing electronics with the imaging system process the image data values to generate a sequence of digital laser drive values which control the intensity of the laser beam.

The modulated laser beam is incident upon a rotating, multi-faceted polygon which reflects the modulated laser beam across the photographic element in a raster pattern, thereby forming a plurality of scan lines of individual spots, known as pixels. The laser beam is modulated with the data at a fixed rate defined by a pixel clock. Typically, the polygon is mounted on an axis substantially orthogonal to the modulated laser beam and is spun by a motor. A complete image is formed on the photographic element by incrementally scanning the entire photographic element.

In order to achieve desirable image quality, such as image sharpness, the length of adjacent scan lines must be substantially equal. In high resolution imaging applications, such as medical imaging, the scan line length must remain constant to within a fraction of a pixel. Errors in scan line length may be caused by mechanical irregularities between individual polygon facets such as variations in "facet height", which is defined as the radial difference of each reflective surface from the rotational axis of the polygon. In order to minimize errors caused by variations in facet height, conventional polygon motor assemblies were constructed within tight mechanical tolerances. For this reason, conventional scanning assemblies are expensive to manufacture.

Other techniques have been developed for correcting facet height errors. For example, one technique generates the pixel clock via a voltage controlled oscillator (VCO) and adjusts the frequency of the VCO for each facet of the polygon in order to maintain a constant scan line length. The facet height error is calculated by measuring a time interval starting when the laser has been modulated with all of the image data and ending when an end-of-scan is received. By adjusting a reference voltage for the VCO, the frequency output of the VCO is controlled such that the proper number of pixels are formed between the start-of-scan signal and end-of-scan signal for each scan line. This technique, however, requires expensive circuitry. Furthermore, because the pixel clock itself is typically used to measure the facet height error, the accuracy of this technique is plus or minus one pixel clock per scan line which may be inadequate for high resolution imaging applications.

For the reasons stated above, and for other reasons stated below which will become apparent to those skilled in the art upon reading and understanding the present specification, there is a need in the art for a scanning assembly that does not require such restrictive manufacturing techniques, is more tolerant to mechanical variations and compensates for facet height error with a high degree of accuracy.

SUMMARY OF THE INVENTION

As explained in detail below, the present invention is directed to a method and system that compensates for scanner facet height error by having selectively modifying individual pixels.

In one embodiment, the invention is a scanning assembly for imaging a photographic element. The scanning assembly includes a scanner having a plurality of reflective surfaces. Each reflective surface is positioned at a corresponding distance from an axis. A laser source produces a laser beam incident upon the scanner such that each reflective surface of the scanner directs the laser beam across a dimension of the photographic element. A controller modulates the laser beam with data according to a pixel clock. In this fashion, the laser beam forms a set of pixels for each reflective surface. The controller modifies the pixel clock for a subset of each set of pixels such that each pixel set has substantially the same scan length. Furthermore, the modified pixels of each scan line are distributed substantially uniformly throughout the respective set of pixels.

According to another feature of the invention, the scanning assembly comprises a counter for generating the pixel clock as a number of a base clock cycles. Furthermore, the controller modifies the number of base clock cycles of the pixel clock for each pixel of each pixel subset, thereby adjusting the width of each pixel of the subset.

In another embodiment, the scanning assembly further comprises a start-of-scan (SOS) sensor and an end-of-scan (EOS) sensor. The controller receives an output from each sensor that indicates a position of the laser beam along the length of the photographic element. Furthermore, the controller determines a scan interval for each reflective surface as a function of the output of the SOS sensor and the output of the EOS output. The controller modifies the number of base clock cycles of the pixel clock for each pixel of each pixel subset as a function of the scan interval of the reflective facet associated with the corresponding pixel set.

In another embodiment, the controller increases the number of base clock cycles of the pixel clock for each pixel of each pixel subset corresponding to a reflective surface having a scan interval greater than a minimum scan interval for all of the reflective surfaces.

In another embodiment, the controller decreases the number of base clock cycles of the pixel clock for each pixel of each pixel subset corresponding to a reflective surface having a scan interval less than a maximum scan interval for all of the reflective surfaces.

In another embodiment, the controller modifies the number of base clock cycles of the pixel clock for each pixel of each pixel subset according to an average of the scan intervals of the reflective surfaces.

In yet another embodiment, the present invention is a method for imaging a photographic element including the steps of rotating a scanner having a plurality of reflective surfaces, exposing the photographic element with a laser beam reflected by the reflective surfaces of the rotating scanner such that the laser beam is directed along a dimension of the photographic element, modulating the laser beam with data according to a pixel clock to form a plurality of sets of pixels across the dimension of the photographic element, each set of pixels corresponding to one of the reflective surfaces of the scanner, and varying the pixel clock for a subset of pixels for each set of pixels, wherein the pixels of the pixel subset are distributed substantially uniformly across the dimension of the photographic element.

These and other features and advantages of the invention will become apparent from the following description of the preferred embodiments, the claims, as well as the drawings. It is to be understood, however, that both the foregoing general description and the following detailed description are exemplary and are not restrictive of the present invention as claimed.

DETAILED DESCRIPTION

In the following detailed description, references are made to the accompanying drawings which illustrate specific embodiments in which the invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Figure 1:
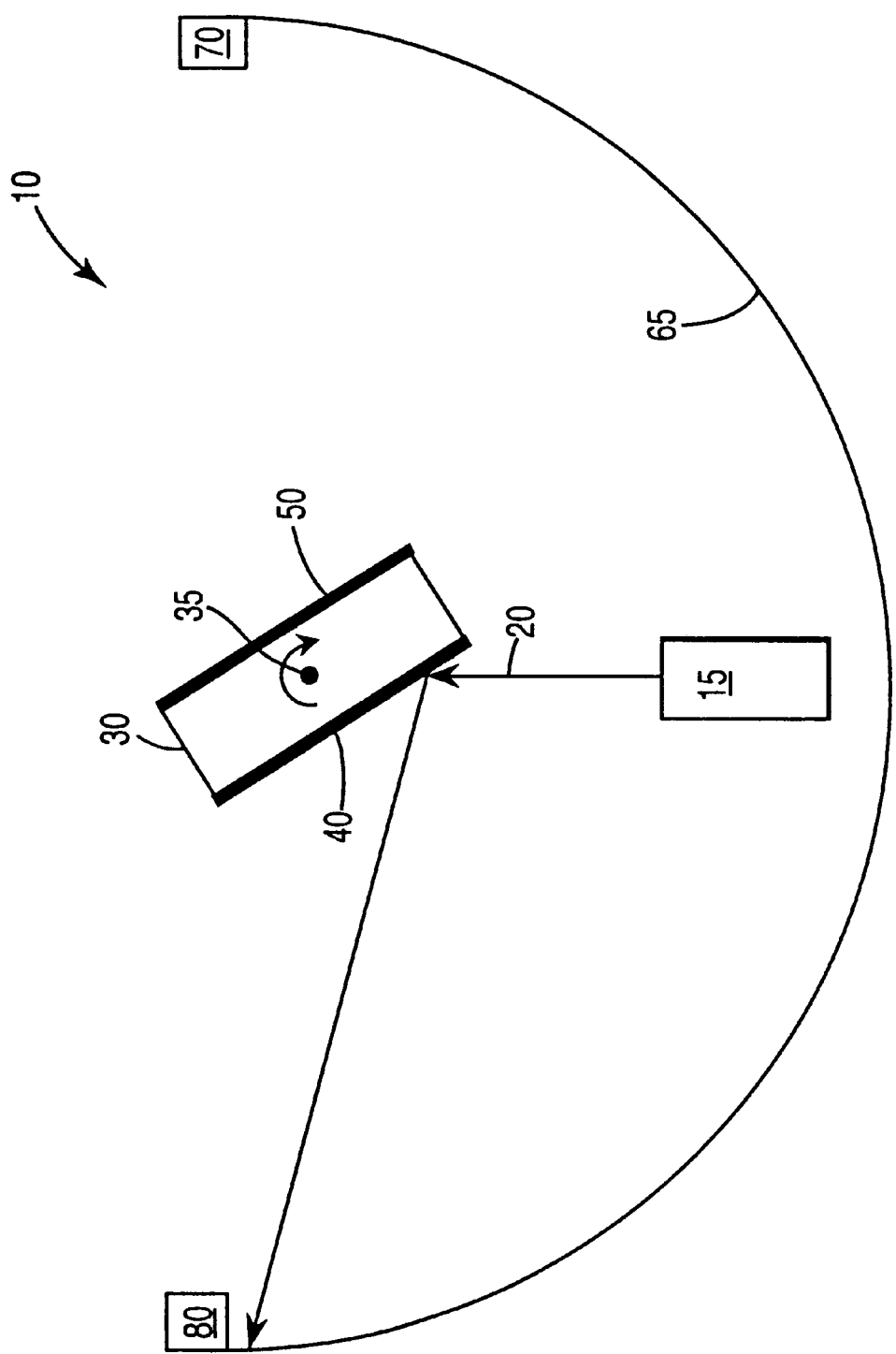
FIG. 1 is a schematic side view of one embodiment of a laser imaging system that compensates for facet height error in accordance with the present invention.

FIG. 1 is a block diagram of imaging system 10 which forms a representation of an image on photographic element 65. Imaging system 10 includes light source 15, scanner 30, start-of-scan sensor 70 and end-of-scan sensor 80. Light source 15 emits light beam 20 incident upon a facet of scanner 30. In one embodiment, light source 15 is a laser source such as an argon ion laser, helium neon laser or a semiconductor laser diode. Light beam 20 is modulated in intensity according to image data at a rate determined by a pixel clock (not shown).

Scanner 30 rotates around axis 35 and includes a first reflective facet 40 and a second reflective facet 50. During a first scan cycle, scanner 30 rotates approximately 90° such that reflective facet 40 sweeps light beam 20 approximately 180°, thereby forming a scan line of image data along a dimension of photographic element 65. During a second scan cycle, second reflective facet 50 directs light beam 20 across photographic element 65 and forms a second scan line of image data. In this fashion, light beam 20 is repetitively directed across photographic element 65 as scanner 30 rotates around axis 35.

For each scan cycle, modulation of light beam 20 is initiated by detecting light beam 20 sweeping across SOS sensor 70. Light beam 20 is modulated in intensity with a predetermined amount of the image data such that a complete scan line of image data is formed along the dimension of photographic element 65. EOS sensor 80 detects light beam 20 subsequent to the formation of the scan line. In one embodiment, light source 15, scanner 30, SOS sensor 70 and EOS sensor 80 are contained within a scanning assembly (not shown) that translates in a direction substantially orthogonal to the exposed dimension of photographic element 65, thereby exposing photographic element 65 in a raster pattern to produce a visible representation of the image data. In another embodiment, photographic element 65 translates in a direction substantially orthogonal to the exposed dimension.

Figure 2:
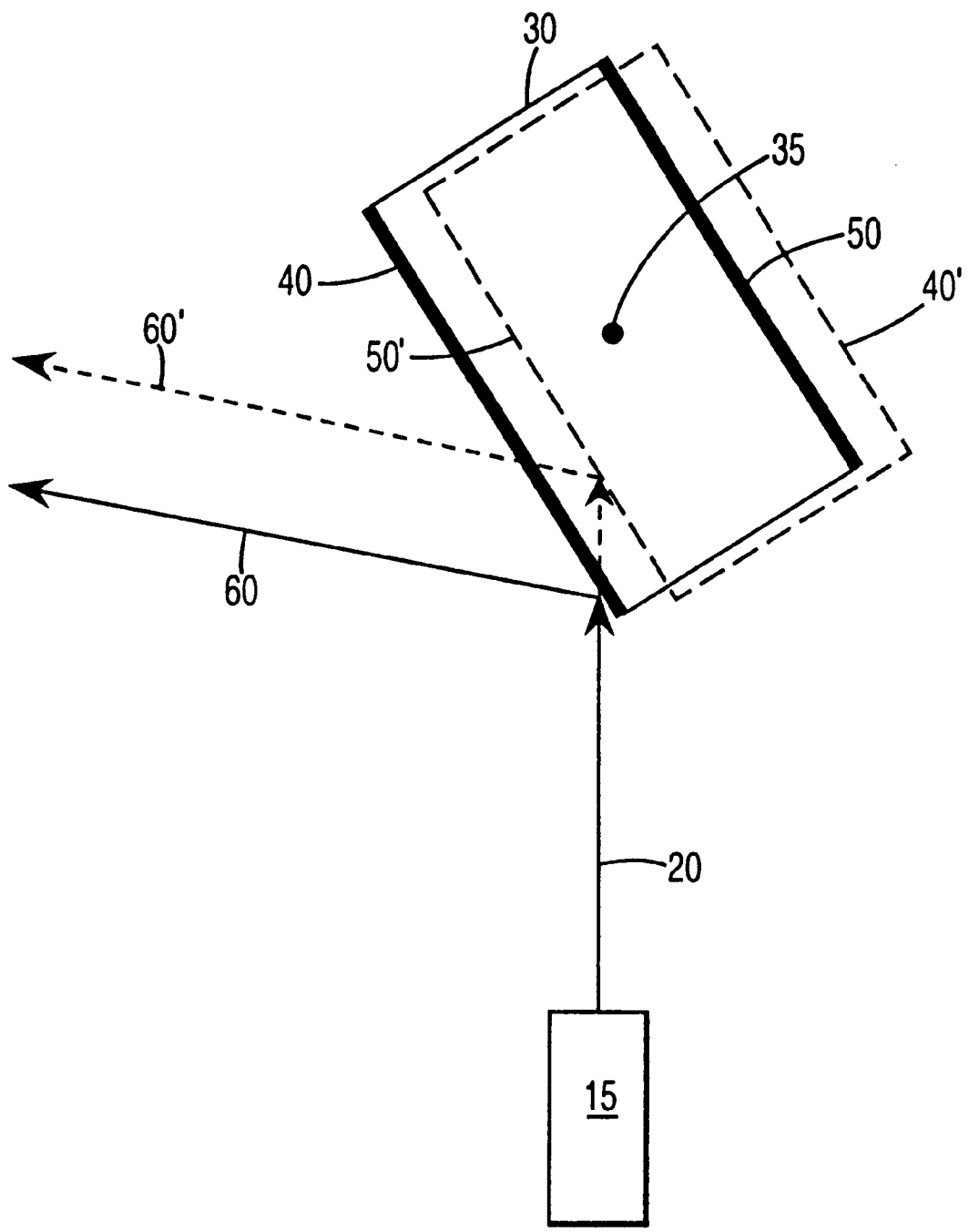
FIG. 2 illustrates in detail a reflective scanner having two mirrored facets according to the embodiment of FIG. 1.

FIG. 2 illustrates in detail scanner 30 of FIG. 1. More specifically, FIG. 2 illustrates the effects of facet height variations between the reflective facets of scanner 30. For any scan angle of the first scan cycle, light beam 20 is reflected by facet 40 as light beam 60. For the same scan angle during the second scan cycle, scanner 30 has rotated 180 degrees and light beam 20 is reflected by facet 50 (indicated as 50' after rotation) as light beam 60'. Light beam 60' is spatially displaced from light beam 60 due to variation in the facet heights of facet 40 and facet 50 of scanner 30. Assuming a uniform angular velocity for scanner 30, the spatial displacement causes light beam 60' to sweep across photographic element 65 (FIG. 1) more quickly than light beam 60. Thus, as light beam 20 is modulated with image data according to the pixel clock, the variation in facet height results in a corresponding variation in the length of each scan line formed on photographic element 65. Therefore, unless corrected in accordance with the present invention, the variation in facet heights for each facet 40 and facet 50 of scanner 30 causes successive scan lines to have different lengths along the dimension of photographic element 65, resulting in substantial image jitter and loss of image sharpness.

Figure 3:
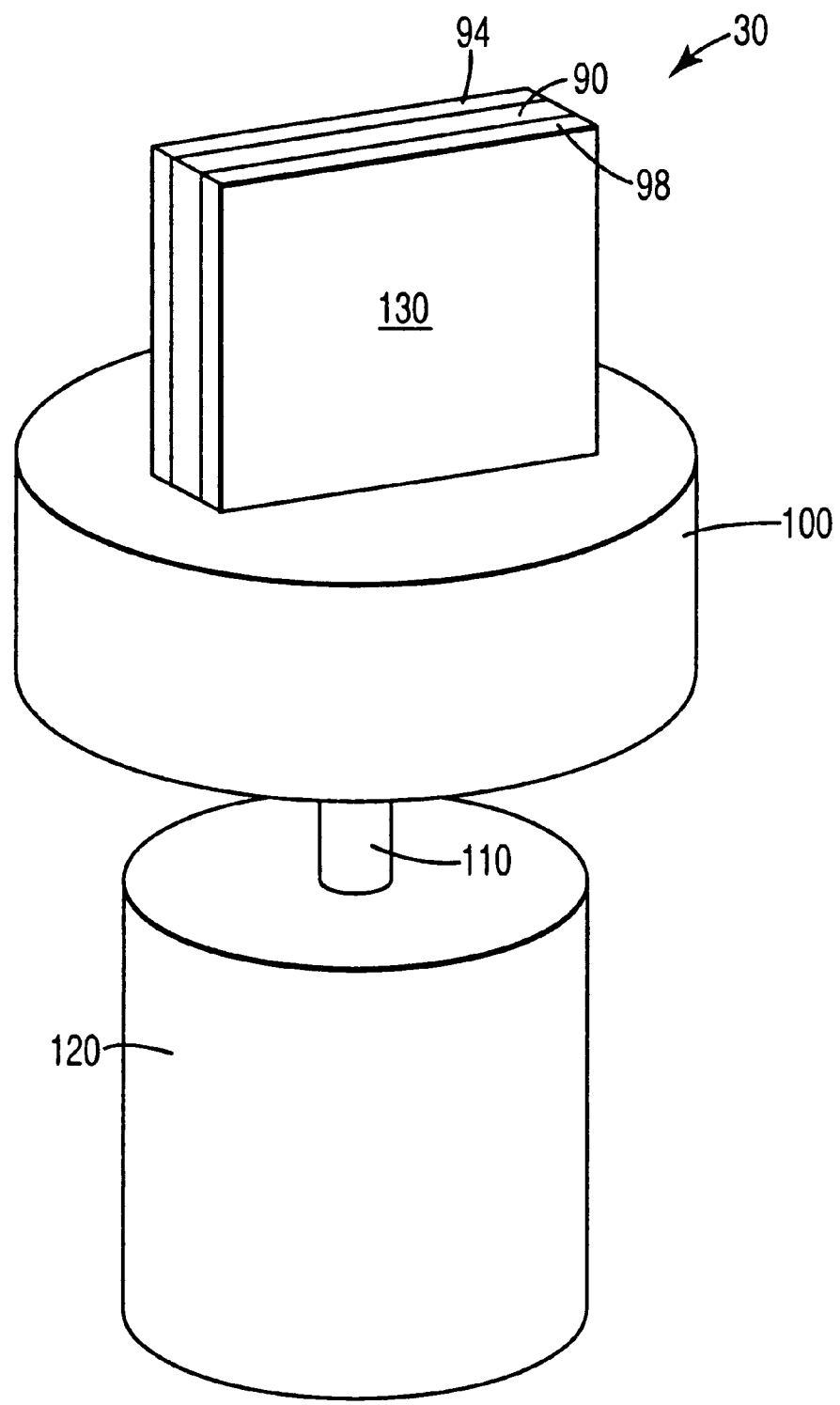
FIG. 3 is a side view of a scanning assembly according to the embodiment of FIG. 1.

FIG. 3 illustrates one embodiment of scanner 30 of imaging system 10. Scanner 30 includes motor 120 having a rotatable shaft 110, adapter 100 and mirror 130. Adapter 100 is coupled to shaft 110 such that engagement of motor 120 causes adapter 100 to rotate in a circular motion in a plane substantially orthogonal to shaft 110. Mirror 130 includes substrate 90 having a first mirrored surface 94 and a second mirrored surface 98. Substrate 90 is adhesively mounted to adapter 100 such that mirror 130 is rotated when motor 120 is engaged. In this configuration, an inexpensive scanning device can be easily manufactured because, as detailed below, the present invention compensates for any facet height errors between first mirrored surface 94 and second mirrored surface 98.

Figure 4:
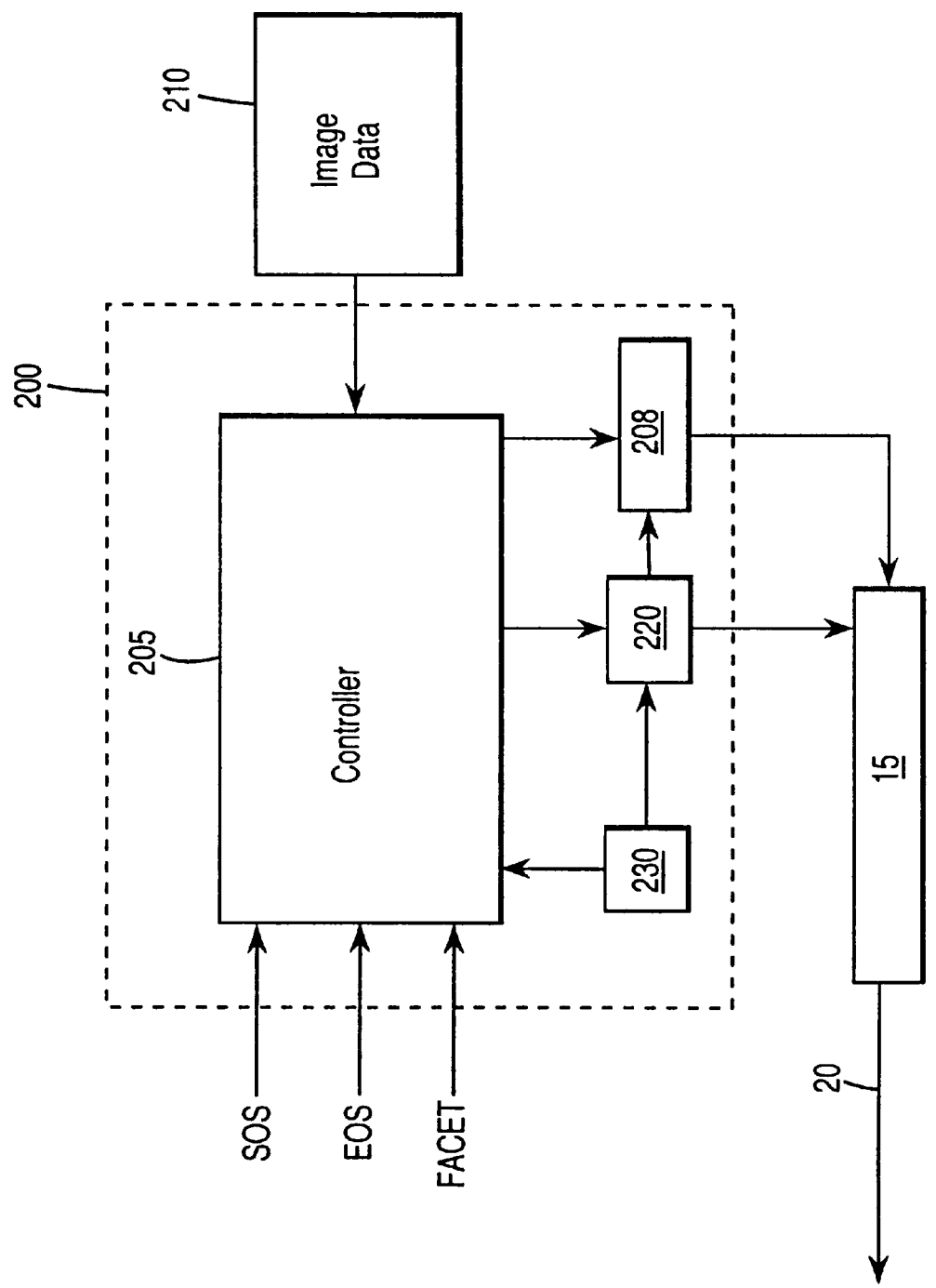
FIG. 4 is a block diagram of a control circuit for compensating for facet height error in accordance with the present invention.

FIG. 4 is a block diagram of a control circuit 200 that compensates for facet height error in accordance with the present invention. Control circuit 200 includes controller 205, line buffer 208, counter 220, and base clock 230. In one embodiment, controller 205 is an inexpensive, commercially available programmable logic such that counter 220 and base clock 230 are on-chip components. In another embodiment, controller 205 is an embedded processor. Base clock 230 provides a continuous clock signal for controller 205 and counter 220. In one embodiment, base clock 230 provides a clock signal having a clock frequency (Freq) equal to 32 MHz.

In order to form a scan line along a dimension of photographic element 65, controller 205 fills line buffer 208 with a predetermined amount of image data 210. For example, a typical image may have 5596 pixels in a single scan line. Thus, controller 205 loads 5596 pixels of image data into line buffer 208.

Controller 205 configures counter 220 to cycle from zero to a predetermined number of base clock cycles per pixel, N, thereby generating a pixel clock for line buffer 208. In this manner, base clock 230 drives counter 220, thereby clocking an individual pixel data into laser source 15 for each N base clock cycles of base clock 230.

Controller 205 receives SOS and EOS signals which indicate the start-of-scan and end-of-scan, respectively, as light beam 20 sweeps across photographic element 65. In addition, controller 205 receives a FACET signal indicating whether reflective facet 40 or 50 of scanner 30 is currently reflecting light beam 20. In one embodiment, the FACET signal is triggered by an optical detector on scanner 30 and pulses when scanner 30 has completed one revolution.

In order to compensate for facet height error in an accurate, inexpensive manner, controller 205 measures a scan interval, T1, starting from the triggering of the SOS signal and ending with the triggering of the EOS signal. Controller 205 repeats the measurement for each scan line, until a corresponding interval has been measured for each reflective facet of scanner 30.

For each facet, the length of the corresponding scan line is inversely proportional to the measured scan interval. For example, a longer duration for the scan interval indicates that light beam 20 is sweeping more slowly across photographic element 65 than for other facets. Thus, assuming laser beam 20 is modulated according to image data 210 with a constant pixel clock, a longer duration for the scan interval corresponds to a short scan line length for a fixed number of pixels. In another embodiment, controller 205 does not measure a scan interval, but a service technician generates a test pattern and measures the physical difference in scan lines for each facet. This approach, however, does not allow for precise compensation of facet height error due to the manual measurement of the difference in scan lines.

In order to measure the scan interval for a particular facet, controller 205 resets counter 220 and sets counter 220 to a count mode upon receiving the SOS signal. Controller 205 stops counter 220 when the EOS signal is received. In this manner, counter 220 is used to determine how many base clock periods (C) each facet requires in order to sweep light beam 20 across photographic element 65 from SOS sensor 70 to EOS sensor 80.

Based on number of base clock periods counted via counter 220, controller 205 calculates the scan interval, T1, for each facet as defined by the equation: T1=C * 1/Freq. For example, if clock 230 has a clock frequency, F, equal to 32 MHz and C equals 5596 upon receiving the EOS signal, the scan interval, T1, for the facet may be calculated by multiplying 5596 * 31.25 ns. In another embodiment, described in detail below, controller 205 calculate the scan interval in units of time, as described by the above equation, but compensates for facet height error according to the required number of base clock periods for the scan line of each facet.

Based on the scan interval, controller 205 calculates a line duration error, T2, for each facet. The present invention contemplates several techniques for calculating the line duration error. In one embodiment, the line duration error for each facet is the time difference between the facet's scan interval, T1, and the largest scan interval for any facet of scanner 30. In another embodiment, the line duration error for each facet is the time difference between the facet's scan interval, T1, and the smallest scan interval for any facet of scanner 30. In yet another embodiment, the line duration error for each facet is the time difference between the facet's scan interval, T1, and an average of scan intervals for all of the facets of scanner 30. In one embodiment, controller 205 calculates a line duration error, T2, in units of time. In another embodiment, the line duration error is expressed as a number of base clock periods.

Based on the line duration error, control circuit 200 modifies a subset of the pixels of each erroneous scan line, thereby adjusting the overall length of each scan line such that each facet produces a scan line of substantially equal scan line length. For example, in one embodiment, control circuit 200 stretches each pixel of the pixel subset for each facet having a scan line length less than a maximum scan line length of all of the facets. In another embodiment, control circuit 200 shrinks each pixel of the pixel subset for each facet having a scan line length greater than a minimum scan line length of all of the facets. In yet another embodiment, control circuit 200 adjusts each pixel of the pixel subset for each facet such that each facet has a scan line length substantially equal to an average of all of the scan line lengths. In this manner, control circuit 200 compensates for facet height error by selectively modifying the width of a each pixel in the pixel subsets.

More specifically, controller 205 calculates a modification period (M) for each facet by dividing the corresponding scan interval by corresponding line duration error: M=T1/T2. Assuming T1 and T2 are expressed as a number of base clock periods, controller 205 increases or decreases counter 220 during the scan cycle for each pixel corresponding to each $M^{th}$ base clock, thereby increasing or decreasing the modulation time of light beam for the corresponding pixel. In other words, controller 205 modifies counter 220 for each M/N pixels to stretches or shrinks the width of the pixel as it is formed on photographic element 65. Thus, the length of the scan line is adjusted by modifying a pixel subset having T2 modified pixels.

For example, a scan line of 5596 pixels will comprises 89536 base clock cycles assuming N equals 16. For a line duration error of 64 base clock cycles, M equals 1399. Thus, controller 205 will insert a base clock cycle for every 1399 base clock cycles, thereby adjusting the length of the scan line.

One advantage of this technique is that the modified pixels are evenly distributed over the entire length of the facet's corresponding scan line. Furthermore, the technique provides a highly accurate method for adjusting scan length in which the accuracy is determined by the frequency of base clock 230, as opposed to the frequency of the pixel clock as in conventional systems. In other words, the resolution for adjustment is limited only by the frequency of the base clock 230.

Typically, compensation for facet height error occurs at the factory after assembly of the imaging system. In this situation, a temporary sensor is used as an EOS sensor in order to calibrate the imaging system. Upon calibration, however, the temporary sensor is removed and the imaging system is shipped to the customer. In this embodiment, the modification period M for each facet is stored in a non-volatile memory. Control circuit 200 (FIG. 4) retrieves the appropriate modification period according to the FACET signal and adjust the scan line length as described above. Alternatively, a permanent EOS sensor is installed within the imaging system, thus allowing a service technician to initiate a calibration procedure in the field. The configuration is advantageous in that the imaging system is able to continuously monitor the scan intervals of each facet of scanner and compensate for facet height error as described above. In this embodiment, control circuit 200 (FIG. 4) includes a second counter (not shown) for determining the scan line interval for each facet while counter 220 is dedicated to generating the pixel clock in accordance with the present invention. In this manner, the modification period, M, can be adjusted for each facet based on the facet's previous scan line while imaging photographic element 65.

CONCLUSION

Various embodiments of an improved method and system that compensates for scanner facet height have been described. In one embodiment, the present invention compensates for facet height error by measuring the scan interval for each facet of a rotating polygon and selectively modifying the widths of a subset of pixels distributed uniformly throughout the scan line.

Several advantages of the present invention have been illustrated including providing a low cost compensation system and technique. Furthermore, the present invention is not limited in accuracy by the pixel clock as are conventional techniques, but is highly accurate and limited only by the frequency of the base clock. Furthermore, the modified pixels are evenly distributed over the entire length of the facet's corresponding scan line, thereby eliminating any visual effects that may be caused by the pixel modification.

This application is intended to cover any adaptations or variations of the present invention. It is manifestly intended that this invention be limited only by the claims and equivalents thereof.

We claim:

1. A scanning assembly for imaging a photographic element comprising:
   a scanner having a plurality of reflective surfaces mounted for rotation around an axis;
   a laser source producing a laser beam incident upon the scanner such that each reflective surface of the scanner directs the laser beam along the photographic element to form a scan line of pixels for each reflective surface; and
   a controller for modulating an intensity of the laser beam with data according to a pixel clock, wherein for each scan line the controller modifies the pixel clock for a subset of the pixels, and further wherein the pixels of each subset are distributed substantially uniformly throughout the respective scan line.

2. The scanning assembly of claim 1, further comprising a counter for generating the pixel clock as a number of a base clock cycles, wherein the controller reprograms the counter in order to modify the pixel clock.

3. The scanning assembly of claim 2, further comprising a start-of-scan (SOS) sensor and an end-of-scan (EOS) sensor, each sensor having an output received by the controller for indicating a corresponding position of the laser beam along the length of the photographic element, wherein the controller determines a scan interval for each reflective surface as a function of the output of the SOS sensor and the output of the EOS output, and further wherein the controller modifies the number of base clock cycles of the pixel clock for each pixel of each pixel subset as a function of the scan interval of the reflective facet associated with the corresponding scan line.

4. The scanning assembly of claim 2, further comprising a start-of-scan (SOS) having an output received by the controller for indicating a first position of the laser beam along the length of the photographic element, wherein the controller determines a scan interval for each reflective surface as a function of the output of the SOS sensor and an output from a temporary end-of-scan sensor indicating a second position of the laser beam along the length of the photographic element, and further wherein the controller modifies the number of base clock cycles of the pixel clock for each pixel of each pixel subset as a function of the scan interval of the reflective facet associated with the corresponding scan line.

5. The scanning assembly of claim 3, wherein the controller increases the number of base clock cycles of the pixel clock for each pixel of each pixel subset corresponding to a reflective surface having a scan interval greater than a minimum scan interval for all of the reflective surfaces.

6. The scanning assembly of claim 3, wherein the controller decreases the number of base clock cycles of the pixel clock for each pixel of each pixel subset corresponding to a reflective surface having a scan interval less than a maximum scan interval for all of the reflective surfaces.

7. The scanning assembly of claim 3, wherein the controller modifies the number of base clock cycles of the pixel clock for each pixel of each pixel subset according to an average of the scan intervals of the reflective surfaces.

8. The scanning assembly of claim 4, wherein the controller increases the number of base clock cycles of the pixel clock for each pixel of each pixel subset corresponding to a reflective surface having a scan interval greater than a minimum scan interval for all of the reflective surfaces.

9. The scanning assembly of claim 4, wherein the controller decreases the number of base clock cycles of the pixel clock for each pixel of each pixel subset corresponding to a reflective surface having a scan interval less than a maximum scan interval for all of the reflective surfaces.

10. The scanning assembly of claim 4, wherein the controller modifies the number of base clock cycles of the pixel clock for each pixel of each pixel subset according to an average of the scan intervals of the reflective surfaces.

11. The scanning assembly of claim 1, wherein the scanner comprises a substantially planar substrate having a first reflective surface opposite from a second reflective surface.

12. The scanning assembly of claim 11, wherein the scanner further comprising:
    an adapter coupled to the substrate; and
    a motor for rotating the scanner around the axis.

13. The scanning assembly of claim 1, wherein the controller receives a facet signal indicating which reflective surface of the plurality of reflective surfaces is directing the laser beam along the dimension of the photographic element.

14. The scanning assembly of claim 1, further comprising a non-volatile memory for holding a modification period for each reflective surface of the scanner, wherein the controller reads the modification period for each facet and modifies the pixel clock according to the read modification period.

15. A method for imaging a photographic element comprising the steps of:
    rotating a scanner having a plurality of reflective surfaces;
    exposing the photographic element with a laser beam reflected by the reflective surfaces of the rotating scanner such that the laser beam is directed along a dimension of the photographic element;
    modulating the laser beam with data according to a pixel clock to form a plurality of pixel scan lines along the dimension of the photographic element, each scan line corresponding to one of the reflective surfaces of the scanner; and
    varying the pixel clock for a subset of the pixels of each scan line, wherein the pixels of each pixel subset are distributed substantially uniformly across the dimension of the photographic element.

16. The method of claim 15, wherein the modulating step comprises the step of generating the pixel clock as a number of a base clock cycles, and further wherein the varying step comprises the step of modifying the number of base clock cycles of the pixel clock for each pixel of each pixel subset.

17. The method of claim 15, wherein the varying step comprises the steps of:

sensing a start-of-scan (SOS) signal indicating the laser beam is at a first location;

sensing an end-of-scan (EOS) signal indicating the laser beam is at a second location; and for each reflective surface, determining a scan interval representative of a time duration between the SOS signal and the EOS signal, wherein the number of base clock cycles of the pixel clock is varied as a function of the scan interval of the reflective facet.

18. The method of claim 17, wherein the varying step increases the number of base clock cycles of the pixel clock for each pixel of each pixel subset that corresponds to a reflective surface having a scan interval greater than a minimum scan interval for all of the reflective surfaces.

19. The method of claim 17, wherein the varying step decreases the number of base clock cycles of the pixel clock for each pixel of each pixel subset corresponding to a reflective surface having a scan interval less than a maximum scan interval for all of the reflective facets.

20. The method of claim 17, wherein the varying step varies the number of base clock cycles of the pixel clock for each pixel of each pixel subset according to an average of the scan intervals of the reflective surfaces.

21. The method of claim 15, further comprising the step of translating the photographic element in a direction substantially orthogonal to the exposed dimension of the photographic element.

22. The method of claim 15, further comprising the step of translating the scanner in a direction substantially orthogonal to the exposed dimension of the photographic element.

23. The method of claim 15, wherein the varying step comprises the step of reading a corresponding modification period for each reflective surface of the scanner from a non-volatile memory, wherein the pixels are distributed substantially uniformly across the dimension of the photographic element according to the corresponding modification period.

* * * * *